United States Patent [19]
Behrens

[11] Patent Number: 5,682,753
[45] Date of Patent: Nov. 4, 1997

[54] NITROGEN GAS WATER CHILLER APPARATUS

[76] Inventor: Robert N. Behrens, 21664 North 58th Dr., Glendale, Ariz. 85311

[21] Appl. No.: 714,949

[22] Filed: Sep. 17, 1996

[51] Int. Cl.⁶ .................................................. F25D 13/06
[52] U.S. Cl. ........................... 62/63; 62/332; 62/374
[58] Field of Search ........................... 62/63, 374, 389, 62/332

[56] References Cited

U.S. PATENT DOCUMENTS 3,395,549  8/1968  Grimes ..................................... 62/63
3,485,055  12/1969  Webster et al. ............................. 62/63
4,852,358  8/1989  Acharya et al. ............................ 62/63

*Primary Examiner*—Ronald C. Capossela
*Attorney, Agent, or Firm*—H. Gordon Shields

[57] ABSTRACT

Nitrogen fruit freezing apparatus includes a conveyor on which fruit passes beneath a spray of liquid nitrogen, and the liquid nitrogen falls downwardly, gasifies, and flows to a chiller unit where the nitrogen gas is used to cool water. The water cooled by the nitrogen gas is sprayed onto the fruit before the fruit is conveyed to the liquid nitrogen freezing area and is sprayed onto the fruit to glaze the fruit after the fruit is frozen. The cooled water may also be used for cooling a room or a building, etc. The nitrogen gas is exhausted to the atmosphere from the water chiller unit.

12 Claims, 3 Drawing Sheets

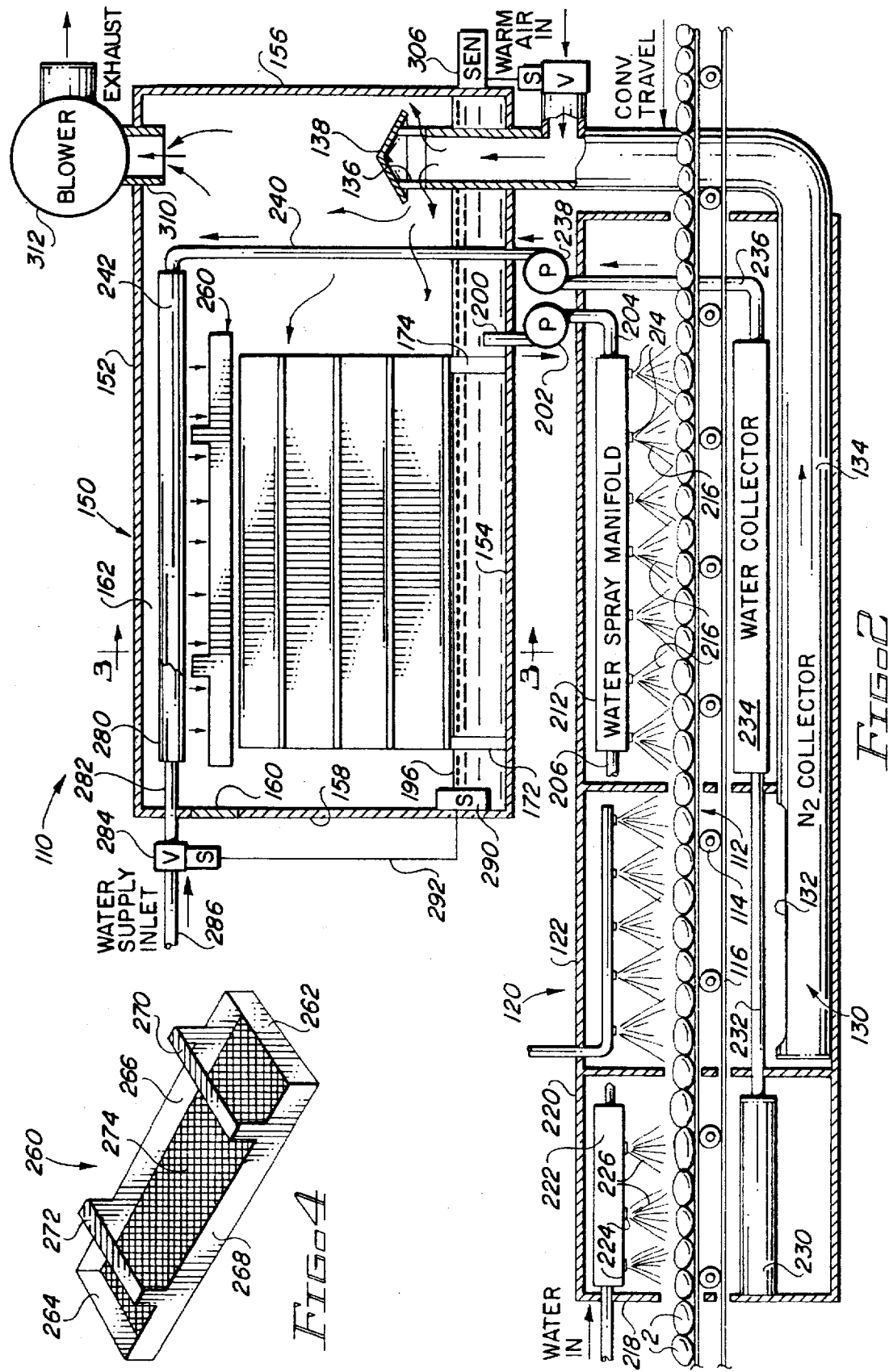

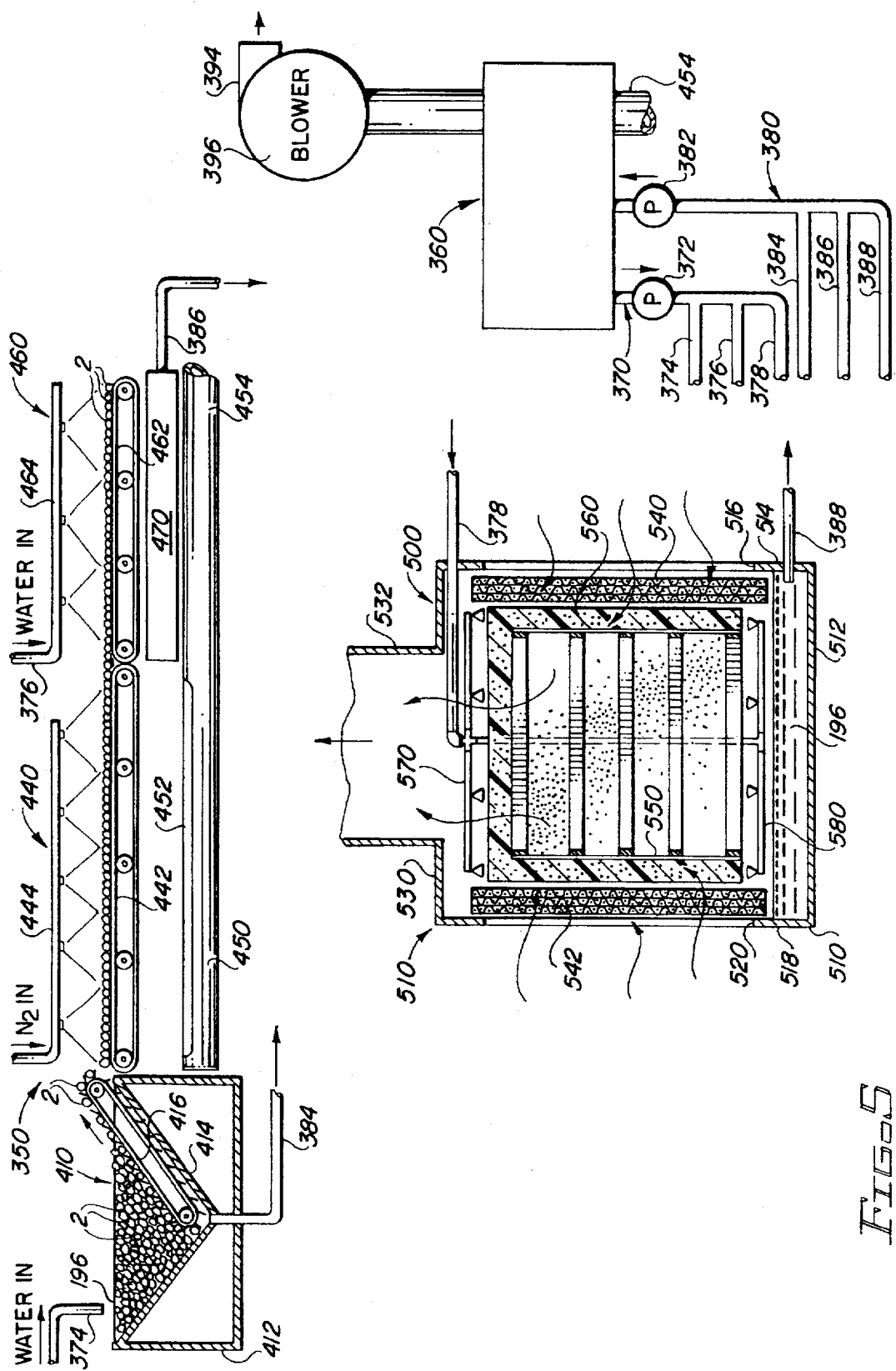

NITROGEN GAS WATER CHILLER APPARATUS

BACKGROUND OF THE INVENTION

1. Field of the Invention

This invention relates to the use of a gas in its liquefied state, such as liquid nitrogen, for freezing edible products, and, the use of the gas for cooling, and more particularly, to the use of the liquid nitrogen for freezing edible products and the use of nitrogen gas for chilling a fluid for precooling the edible products prior to the freezing process by the liquid nitrogen, and for glazing the product after the freeze process.

2. Description of the Prior Art

In the prior art, liquid nitrogen is sprayed onto edible products, such as fruit, as the products move on a conveyor within an enclosure. As the liquid nitrogen falls downwardly, it becomes a gas, and, being heavier than air, falls downwardly into a pipe or duct and is exhausted from the enclosure by a fan. The gaseous nitrogen is returned to the atmosphere.

The prior art process is relatively expensive in that the nitrogen gas is used only once before being exhausted to the atmosphere.

The present invention utilizes the nitrogen gas, which is relatively cold, to cool water, and the cooled water is used to precool an edible product, thus decreasing the amount of liquid nitrogen required to freeze, and to glaze the product after the freezing process.

SUMMARY OF THE INVENTION

The invention described and claimed herein comprises apparatus for freezing edible products, such as fruits and vegetables, using liquid nitrogen, and recirculating the nitrogen by collecting the nitrogen gas and using the nitrogen gas to cool a liquid, such as water. The cooled water is used to precool the product prior to the product being conveyed to the liquid nitrogen chamber for freezing, and to glaze the product after freezing. The cold water precools the product to enhance the freezing process. The nitrogen gas, after cooling the water, is exhausted to the atmosphere. The cooled water may also be used to cool air for circulation in a room or building.

Among the objects of the present invention are the following:

To provide new and useful apparatus for precooling and glazing an edible product;

To provide new and useful apparatus for reusing nitrogen after the nitrogen has been used to freeze an edible product;

To provide new and useful apparatus for precooling water using nitrogen gas collected from liquid nitrogen;

To provide new and useful apparatus for precooling an edible product prior to freezing the product using water chilled by nitrogen gas;

To provide new and useful apparatus for using nitrogen gas to cool water sprayed on fruit to precool the fruit and to glaze the fruit after freezing; and To provide new and useful apparatus for cooling air using water cooled by nitrogen gas.

BRIEF DESCRIPTION OF THE DRAWING

FIG. 2 comprises a view in partial section of the apparatus of the present invention.

FIG. 4 is a perspective view of a portion of the apparatus of the present invention.

FIG. 5 is a schematic representation of an alternate embodiment of the apparatus of the present invention.

DESCRIPTION OF THE PREFERRED EMBODIMENT

Figure 1:
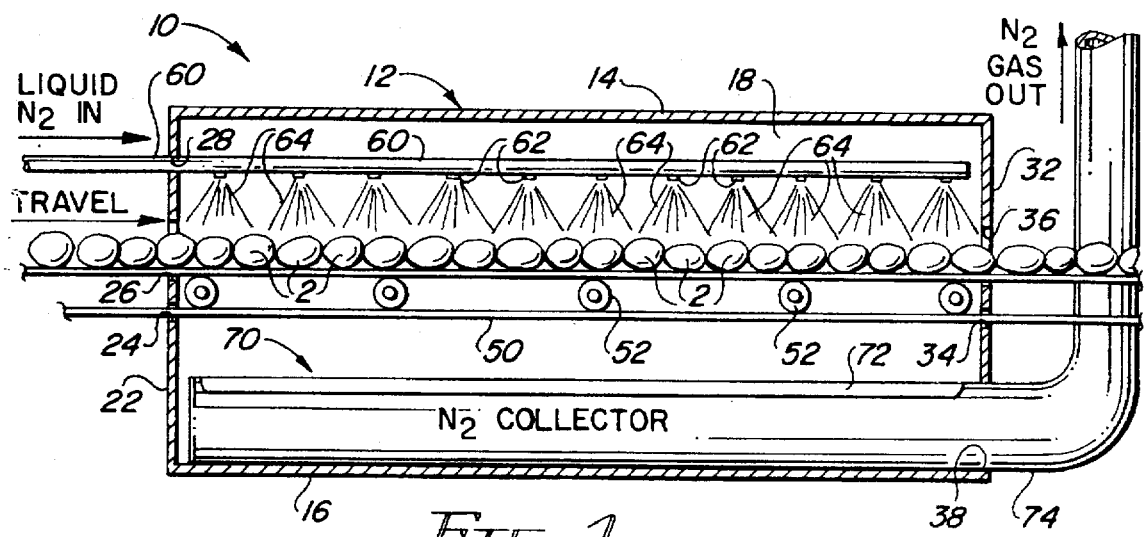
FIG. 1 comprises a view in partial section of the apparatus of the prior art.

FIG. 1 is a side view in partial section of prior art apparatus 10. The prior art apparatus 10 includes a housing 12 which is of a generally rectangular configuration. The housing 12 includes a top 14, a bottom 16, and a pair of sides, of which a side 18 is shown in FIG. 1. The housing 12 also includes two ends, an end 22 and an end 32. Extending through the end 22 are slots 24 and 26 through which a conveyor belt 50 extends. The end 32 includes slots 34 and 36 through which the conveyor belt 50 extends.

The end 22 also includes an upper aperture 28 through which extends a liquid nitrogen line 60. On the bottom of the liquid nitrogen line 60 are spray heads 62 from which liquid nitrogen spray 64 falls onto an edible product 2 disposed on the conveyor belt 50.

It will be understood that there are many edible products that are frozen by liquid nitrogen, and fruits of various kinds are included. For convenience hereafter, the term "fruit" will be used as an illustrative representation of the edible products suitable for freezing.

The liquid nitrogen spray 64 freezes the fruit 2, and turns into a gas as it falls downwardly. The nitrogen gas, being heavier than air, falls to the bottom of the housing 12 and into a nitrogen collector conduit or pipe 70. The nitrogen collector pipe 70 extends through an opening 38 in a lower part of the end 32.

The nitrogen collector pipe 70 extends to a blower 72, not shown in FIG. 1, which pulls the nitrogen gas from the collector pipe 70 and discharges it through an outlet or discharge pipe 74. The discharge pipe 74 extends upwardly and allows the nitrogen gas to be discharged into the atmosphere.

FIG. 2 is a view in partial section through apparatus 110 of the present invention. The apparatus 110 includes a conveyor 112 on which there is disposed fruit or other edible products 2. The conveyor 112 is supported by and moved on a plurality of rollers 114, and the rollers 114 are appropriately secured to a frame 116. Such conveyor systems are well known and understood in the art, and details are accordingly not shown.

The conveyor 112 moves through a housing or cabinet 120. The cabinet 120 is divided into three portions, including a first or precooling portion 210 in which cooled water is sprayed onto the fruit 2, a second, or central, freezing portion 122 in which liquid nitrogen is sprayed onto the fruit to freeze the fruit, and a third or glazing portion 220 in which cold water is again sprayed onto the now frozen fruit.

In the freezing portion of the housing 120, there is a line 120. A number of spray heads 124 are secured to the line 122. Liquid nitrogen flows into the line 122 and to the spray heads 124 and onto the edible products or fruit 2.

At the bottom of the central, freezing, portion of the cabinet 120 is a nitrogen collector conduit or pipe 130. Within the cabinet 120 the collector pipe 130 includes a top opening 132. Outside of the central portion of the cabinet 120, the pipe 130 continues as a closed portion 134. The closed portion 134 extends into a cabinet or unit 150 and terminates in an open top 136 within the cabinet 150. Above the open top 136 is a cap 138.

The nitrogen gas from the freezing portion of the cabinet flows downwardly through the open top 132 of the pipe or conduit 130 within the cabinet 120, and out of the cabinet 120 through the closed portion 134 and into the cabinet 150. The nitrogen gas then flows from the open top 136 of the conduit or pipe 134 and into the cabinet 150.

The cabinet 150 comprises a water chiller unit in which the nitrogen gas, which is still relatively cold, is used to chill water that is used for both precooling the material 2 and is used to glaze the material 2 after the material has been frozen by the liquid nitrogen in the spray cabinet 120.

Figure 3:
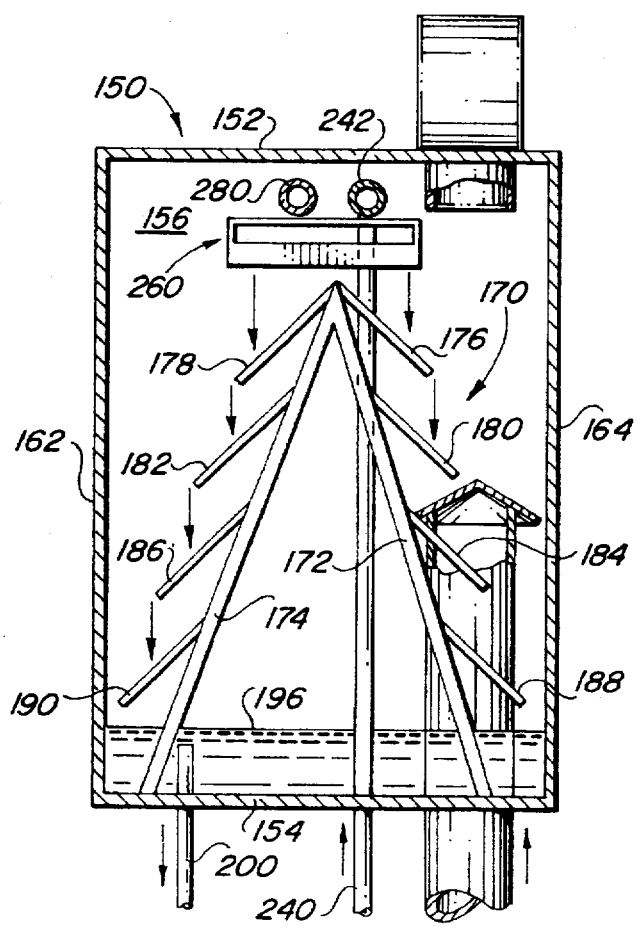
FIG. 3 is a view in partial section taken generally along line 3—3 of FIG. 2.

The water chiller cabinet 150 is shown in both FIGS. 2 and 3. FIG. 3 is a view in partial section taken generally along line 3—3 of FIG. 2. For the following discussion of the cabinet 150, reference will be made to both FIGS. 2 and 3.

The chiller cabinet 150 includes a top plate 152, a bottom plate 154, a pair of end plates 156 and 158, and a pair of side plates 162 and 164. The plates are appropriately secured together to provide a generally water tight and reasonably air tight housing. At the bottom of the cabinet 150 is a sump for holding water chilled in the cabinet by the gaseous nitrogen. The water is recirculated, as discussed below.

Within the cabinet 150 is a water baffle unit 170. The water baffle unit 170 includes a pair of frames 172 and 174, spaced apart from each other, and a plurality of baffle plates appropriately secured to the frame members 172 and 174. As best shown in FIG. 3, the frame members 172 and 174 comprise essentially inserted vee elements, each including a pair of structural members appropriately secured to the bottom plate 154. The baffle plates secured to the frame members 172 and 174 include a pair of upper baffle plates 176 and 178, a pair of baffle plates 180 and 182 spaced apart downwardly from the pair 176 and 178, a third pair of baffle plates 184 and 186, spaced apart downwardly from the baffle plates 180 and 182, and a bottom pair of baffle plates 188 and 190. The baffle plate pairs are spaced apart from each other, as best shown in FIG. 3. The baffle plate pairs are appropriately secured, as by welding, to the frame members 172 and 174.

As best understood from FIG. 3, the baffle plates overlap each other and provide surface areas on which water falls. The water falls from the baffle plates into the bottom of the cabinet 150. The bottom of the cabinet 150 comprises a sump for water 196.

Water 196 flows out of the chiller cabinet 150 from or through a standpipe 200, and flows to a pump 202. The pump 202 pumps the water through a conduit 204 to a water spray manifold 212 in the precool portion 210 of the housing 120. The water spray manifold 212 includes a plurality of spray heads 214 from which water spray 216 flows onto the edible product 2, which, is indicated above, is typically fruit. The water spray 216 precools the fruit 2 prior to the fruit 2 being conveyed into the cabinet portion 122 where liquid nitrogen is sprayed onto the fruit to freeze it.

A connecting conduit 206 extends from the manifold 212 to a second water spray manifold 222. The second water manifold 222 includes a plurality of spray heads 224 from which water spray 226 is sprayed onto the now frozen fruit 2. The spray 226 provides a glaze on the fruit 2.

Beneath the water spray manifolds 222 and 212 are water collector trays 230 and 234, respectively. The collector trays 230 and 234 are connected by a conduit 232. From the water collector tray 234, a conduit 236 extends to a pump 238. A conduit 240 receives water pumped by the pump 238. The pump 238 pumps the water upwardly in the conduit 240 to a spray bar 242 within the cabinet 150.

The spray bar 242 is disposed in the upper portion of the water chiller cabinet 150 and above a clean out tray 260. The dean out tray 260 is disposed above the water baffle unit 170.

FIG. 4 comprises a perspective view of the clean out tray 260. The clean out tray 260 is shown in FIG. 2 from the side, and in FIG. 3 from the end. For the following discussion, reference will primarily be made to FIG. 4, but reference may also be made to FIGS. 2 and 3.

The clean out tray 260 is of a generally rectangular configuration, with a pair of end plates 262 and 264 spaced apart from each other. The end plates 262 and 264 are connected by a pair of side plates or panels 266 and 268. Extending upwardly from the sides 266 and 268, and between the respective sides, are two handles 270 and 272. A mesh bottom 274 is appropriately secured to the bottom portions of the end plates or panels 262 and 264 and the sides plates or panels 266 and 268.

As indicated above, the clean out tray 260 is disposed above the water baffle unit 170 and beneath the spray bar 242. Accordingly, the water flows from the spray bar 242 from the first onto the mesh bottom 274 of the clean out tray 260 before falling onto the baffle plates of the baffle unit 170. The water clean out tray 260 is appropriately supported within the cabinet 150. The clean out tray is removed through the clean out door 160 in the end 158 of the cabinet 150.

A second spray bar 280 is also disposed above the clean out tray 260 in the cabinet 150. The spray bar 280 is essentially identical to the spray bar 242. The spray bar 280 is connected to a water supply conduit 282 which extends between the spray bar 280 and a valve 284. The valve 284 is in turn connected to a water supply line 186.

The valve 284 is in turn connected to a sensor 290 which is secured to the plate or panel 158 adjacent to the bottom 154 in the cabinet 150. The sensor 290 is simply a water level sensor. When the sensor 290 detects a low water level, or a predetermined level of the water 196 in the cabinet 150, the valve 284 is opened to allow makeup water to flow into the conduit 282 and to the spray bar 280. At such time as the level of the water 196 reaches a predetermined maximum, the sensor 290 causes the valve 284 to close, thus shutting off the fresh water from the conduit 286.

A conduit 300 is connected to the pipe or conduit 134 below the cabinet 150. The conduit 300 is secured to a valve 302. The valve 302 opens in response to an input from a temperature sensor 308 which is connected to the valve 302 by a conductor 308. Outside, or warm, air flows through the open valve 302 and through the conduit 300 into the conduit 304, as required for controlling the temperature within the cabinet 150.

Both the valve 284 and the valve 302 are solenoid operated, as is well known and understood in the art. The electrical current for operating the solenoids associated with the respective valves have not been shown, but such is well known and understood in the art.

The air and nitrogen atmosphere within the cabinet 150 is exhausted through the atmosphere by a means of a conduit 310 and a blower 312. The conduit 310 extends downwardly into the cabinet 150 through the top wall 152 a relatively short distance. The blower 312 is simply an exhaust blower or fan and provides a low pressure within the cabinet 150. It is the low pressure within the cabinet 150 that pulls the nitrogen gas through the opening 132 in the conduit 130, and through the closed portion 134 into the interior of the cabinet 150. The nitrogen gas is, as indicated above, still quite cold, and is used to cool the water from both the spray bars 242 and 280 as the water flows downwardly across the baffle plates of the baffle unit 170 and to the bottom of the cabinet 150. Thus, the nitrogen is used essentially twice, once as a liquid in the freezing process of the fruit 2, and secondly, as a gas, for cooling a liquid, such as water, within the cabinet 150. The cooled water is used twice, once for precooling the product or fruit 2 and secondly for providing a glaze on the frozen product. Residue water from both the precooled and the glazing is then recirculated back into the chiller cabinet 150 and is appropriately reused.

The water in the cabinet 150 is cooled as it passes through the nitrogen gas and also as it flows over or on the baffle plates of the baffle unit 170. The cabinet 150 may be insulated, if desired, to maximize the cooling effect of the nitrogen gas.

FIG. 5 is a schematic representation of an alternate embodiment 350 of the apparatus 110 of FIGS. 2, 3, and 4. The apparatus 350 includes a water chiller unit 360, a precooler unit 410, a freezing unit 440, a glazing unit 460, and a room cooler unit 500.

The water chiller unit 360 is substantially identical to the water chiller cabinet or unit 150 discussed above. Accordingly, details are not shown. For purposes of the apparatus 350, the unit 360 includes, among other elements, a cold water discharge conduit or pipe 370. A pump 372 in the conduit 370 pumps water from the conduit 370 to the precooling trait 410 through a pipe or conduit 374, to the glazing unit 460 through a conduit or pipe 376, and to the room cooling unit 500 through a pipe or conduit 378.

A water return pipe or conduit 380 returns water to the chiller unit 360 from the units 410, 460, and 500 by way of return pipes or conduits 384, 386, and 388, respectively. The return water is pumped from the three units by a pump 382 in the conduit 380.

The precooling unit 410 includes a frame 412 in which there is a generally vee shaped hopper 414. A conveyor 416 is disposed in the hopper 414 and extends upwardly from the hopper 414 and discharges fruit 2 onto a conveyor 442. The conveyor 442 then conveys the fruit 2 through the freezing unit 440.

The hopper 414 receives fruit and precools the fruit by means of chilled or cooled water 196 therein. The cooled water 196 flows into the hopper 414 from the conduit 374, discussed above. The water flows from the hopper 414 through the conduit 384 back to the chiller unit 360. The water flow through the respective conduits into and out of the hopper 414 may be appropriately controlled, as desired.

In the freezing unit 440, liquid nitrogen is sprayed onto the fruit 2 from a nitrogen spray bar 444 as the fruit moves on the conveyor 442 beneath the nitrogen spray bar 444. The spray bar 444 is substantially identical to the bar 124, with its spray heads, as discussed above.

At the lower portion of the unit 440 is a nitrogen collector pipe 450. The pipe or conduit 450 includes a top opening 452 through which the gaseous nitrogen falls or flows into the pipe 450. The gaseous nitrogen then flows through conduit portion 454 to the unit 360, where the cold gaseous nitrogen is used to cool water. Nitrogen gas is exhausted to the atmosphere from the unit 360 through a discharge conduit or pipe 394 by means of a blower 396. This is substantially as discussed above for the conduit 310 and blower 312 of the unit 150.

Frozen fruit 2 from the conveyor 442 is moved on a conveyor 462 in the glazing unit 460. At the top or upper portion of the glazing unit 460 is a spray bar 464. The bar 464 receives a flow of cold or chilled water through the conduit 376, and the chilled or cooled water is sprayed onto the frozen fruit 2 from spray heads on the spray bar 462 to provide a glaze on the frozen fruit.

A water collector tray 470 is disposed at the lower portion of the unit 460 and beneath the conveyor 462 to catch the residue of the water from the spray heads of the spray bar 464 which falls past the fruit 2. The water from the collector 470 flows back to the unit 360 through the conduit 386.

The room cooler unit 500 is shown in partial section in FIG. 5. The unit 500 includes a housing 510 which includes a bottom 512, a pair of sides 514 and 518, a pair of ends, not shown, extending between the sides 514 and 518, and a top 530. In the sides 514 and 518 are openings 516 and 520, respectively. The openings are generally rectangular in configuration. The ends also have similar openings. The sides and ends are appropriately secured to both the top 530 and the bottom 512. A duct 532 extends upwardly from the top 530 for conveying air cooled in the unit 500 to a room, building, etc.

Appropriate filters are disposed at the openings 516 and 520 for filtering air flowing into the unit 500. A filter 540 and a filter 542 are shown adjacent to the openings 516 and 520, respectively. The openings in the ends, not shown, also include appropriate filters.

Within the housing 512 is an inner frame 550. The frame 550 is a three dimensional, generally rectangular frame which to which is disposed foam pads 560. The pads 560 are disposed on the four sides and top of the frame 550.

Above the frame 550 and the pads 560 is a spray bar 570. A similar spray bar 580 is disposed beneath the pads 560. The spray bars 570 and 580, each with a plurality of spray heads, are connected to the supply conduit 378 for conveying chilled water from the unit 360 via the conduit 370 and the pump 372, as discussed above.

The cooled or chilled water is sprayed onto the pads 560, which may be open cell foam. The chilled water soaks the pads. Excess or residue water falls from the pads 560 to the bottom of the housing 510. From a sump defined at the bottom of the housing 510, the water returns to the unit 360 through the conduit 386, as discussed above.

Air is pulled into the housing 510 through the openings in the sides and ends of the housing and is pulled through the soaked pads 560. The inflowing air is cooled by the chilled water in the pads and then flows out of the housing 510 through the conduit 532. A blower (not shown) in the conduit 532 is used to move the cooled air.

Depending on humidity conditions, some of the inflowing air may be evaporatively cooled as is passes through the pads 560, but ordinary heat exchange between the air and the chilled water in the pads may be the primary manner of cooling the inflowing air.

While nitrogen in its liquefied and gaseous states has been illustrated herein, it is obvious that any liquefied, and thus cooled, gas may be used for the freezing agent and, in its gaseous state, may be used as the cooling agent for the water.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Freezing and cooling apparatus using a liquefied gas having a liquid state and gaseous state comprising in combination:

a housing for receiving edible products to be frozen;

means for moving edible products into and out of the housing;

means for providing a spray of the liquefied gas on the edible products in the housing to freeze the edible products;

chiller cabinet means for receiving the gaseous state of the liquefied gas;

means for conveying the gaseous state of the liquefied gas out of the housing and to the chiller cabinet means;

means for providing a flow of water in the chiller cabinet means whereby the water is cooled by the gas; and means for pumping the cooled water out of the chiller cabinet means.

2. The apparatus of claim 1 in which the means for conveying the gas in the gaseous state out of the housing includes a conduit for receiving the gas as the liquefied gas changes to its gaseous state from its liquid state, and the conduit extends to the chiller cabinet means.

3. The apparatus of claim 2 which further includes first means for spraying the cooled water on the edible product to precool the edible product prior to freezing and for conveying any residue water back to the chiller cabinet means for reuse.

4. The apparatus of claim 2 which further includes second means for spraying the cooled water on the edible product after freezing to glaze the edible product after freezing, and means for conveying any residue water back to the chiller cabinet means for reuse.

5. The apparatus of claim 2 in which the chiller cabinet means incudes:

a cabinet connected to the conduit for receiving the gas, and baffle means over which the water flows to be cooled by the gas.

6. The apparatus of claim 1 in which the means for providing a flow of water in the chiller cabinet means includes a spray bar for providing a spray of water, and baffle means for receiving the spray of water, whereby the water is cooled by the gas from the housin.

7. The apparatus of claim 1 in which the chiller cabinet means further includes a chiller cabinet and the means for conveying the gaseous state of the liquified gas includes a first conduit extending from the housing to the cabinet.

8. The apparatus of claim 7 in which the chiller cabinet means further includes a second conduit through which the gas is exhausted from the chiller cabinet.

9. A method of using a gas in its liquefied and gaseous states comprising in combination the steps of:

providing a housing;

providing a liquefied gas in the housing;

providing an edible product in the housing;

spraying the liquefied gas on the edible product to freeze the edible product;

collecting the gaseous product from the liquefied gas spray;

providing a chiller cabinet;

providing a flow of water to the chiller cabinet; and transmitting the gaseous product to the chiller cabinet for cooling the flow of water in the chiller cabinet.

10. The method of claim 9 which further includes the step of providing a flow of the cooled water to precool the edible product.

11. The method of claim 9 which further includes the step of providing a flow of the cooled water to glaze the edible product after freezing.

12. The method of claim 9 which further includes the steps of providing a flow of air into the housing, and providing a flow of the cooled water to cool the flow of air in the housing.

* * * * *